Figure 1:
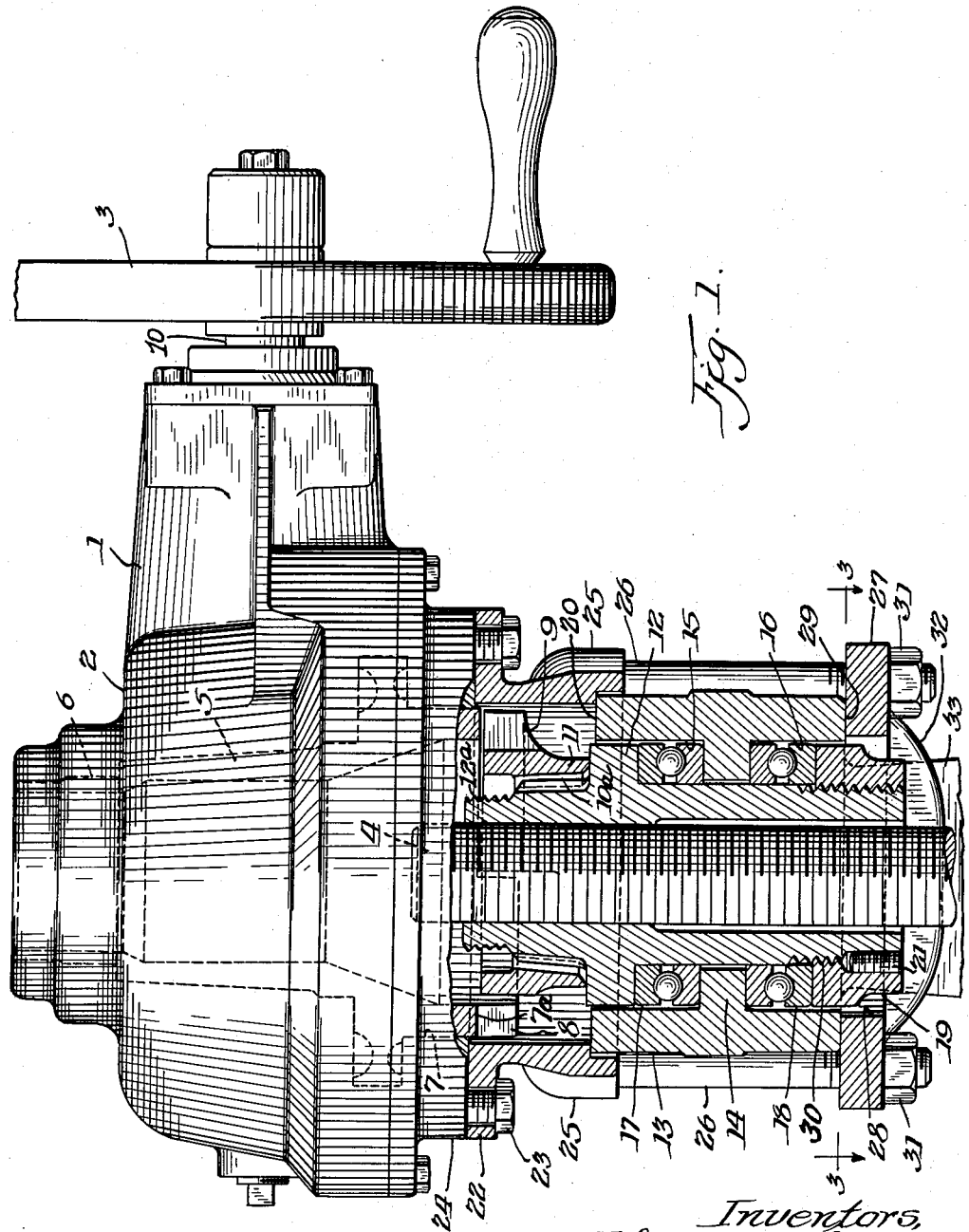

Dec. 31, 1963  K. B. BREDTSCHNEIDER ETAL  3,115,786
MOTOR OR GEAR UNIT ADAPTER
Filed June 20, 1961   2 Sheets-Sheet 1

Inventors,
John P. Doelger,
Kurt B. Bredtschneider, &
Joseph A. Englert.
By Joseph O. Lange Dec. 31, 1963 K. B. BREDTSCHNEIDER ETAL 3,115,786
MOTOR OR GEAR UNIT ADAPTER
Filed June 20, 1961 2 Sheets-Sheet 2

Inventors,
John P. Doelger,
Kurt B. Bredtschneider, &
Joseph A. Englert.
By Joseph C. Lange
Atty.

United States Patent Office 3,115,786
Patented Dec. 31, 1963

3,115,786
MOTOR OR GEAR UNIT ADAPTER
Kurt B. Bredtschneider, Joseph A. Englert, and John P. Doelger, Chicago, Ill., assignors to Crane Co., Chicago, Ill., a corporation of Illinois
Filed June 20, 1961, Ser. No. 118,412
4 Claims. (Cl. 74—432)

This invention relates generally to an adapter construction for application to motor or gear units for use on manually operated valves, and, more particularly, it is concerned with a mechanism employing a novel convenient method of attachment of such units to the valves useful in the conversion of hand operated valves to operation by power or gear units in the field without substantial dismantling being required there.

At the outset, in order to acquire a better appreciation of the value of this contribution, it should be understood that the problem has long existed in the inability to provide suitable and relatively inexpensive adapters for attachment to hand-operated valves without requiring shutting down of the pipe line and thus interrupting operation. In making such conversion attachment heretofore, also special and costly machining or welding in the field has frequently been required. In many cases, because of the lack of proper equipment and the accompanying expense and inconvenience in effecting the attachment of the adapter, such conversion or change-over has virtually been prohibitive.

Accordingly, it is one of the more important objects of this invention to provide for an adapter mechanism of the character hereinafter described whereby the method of its attachment is relatively simple and easily accomplished economically. This mechanism is of special value and significance in such cases in which the adapter is to be applied to valves employing ball bearing yokes and yoke sleeves.

The conversion unit of this invention is related generally to such adapter valve operators of the types set forth respectively in U.S. patent application Serial No. 61,019, filed October 6, 1960, for Detachable Valve Actuating Means, now issued Patent No. 3,034,371, issued May 15, 1962, and in U.S. Patent No. 2,859,639, issued November 11, 1958, for Manual Valve Adapter.

More specifically, it is an important object to provide an easily installable conversion unit which consists primarily of a plurality of spaced apart bolt means depending from a simple adapter member and functioning in cooperation with a loose flange or plate conveniently mounted inwardly of the ball bearing hub or outer housing portion of the yoke. As will hereinafter be made clear, by the simple expedient of tightening the bolt nuts relative to such demountable flange or plate, the adapter is then brought into firm connection with the upper surface of the yoke and the unit is ready for valve actuation immediately.

A further object is to provide for an adapter construction in which the employed mechanism is durable and economical, and of the type which may be made easily and conveniently on existing manually operated valves already in use without requiring special skill, tools, or equipment.

The present invention solves these prior difficulties by providing for the adaptation of manually operated valves to power operation in a very simple and easy manner without removal or dismantling or the application of special yokes and pads for the mounting of flanges and yet with proper alignment and mounting of the power and gear units desired.

Figure 2:
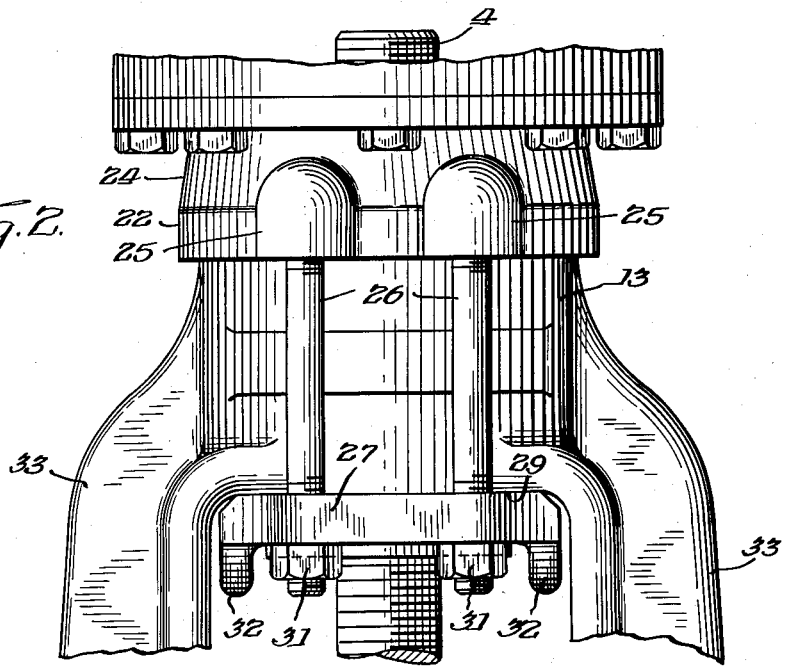

Other objects and advantages will become more readily apparent upon proceeding with the description read in light of the accompanying drawings, in which:

FIG. 1 is a fragmentary sectional assembly view of a valve operator employing the adapter of this invention;
FIG. 2 is a fragmentary front exterior view showing the mounting of a unit embodying our invention; and
FIG. 3 is a fragmentary sectional view taken on the line 3—3 of FIG. 1.

Referring now to FIG. 1, a motor operator unit generally designated 1 is shown which consists of a casing 2 containing the usual reduction gears (not shown) to effect the application of greater force in the operation of the valve. At one end portion thereof, the casing is provided with a handwheel 3 mounted on a projecting actuating shaft 10. In cooperation with said reduction gearing and for the purpose of expediting the power actuation of the non-rotatable valve stem 4 and bring about reciprocating movement whereby to open or close a valve (not shown) a rotatable drive sleeve 5 is employed in the unit casing 2 as indicated in the dotted lines. The said drive sleeve is journalled at its upper portion 6 within the unit housing 2 on an axis parallel to the valve central axis. The said drive sleeve at 7 is provided at an inner limit thereof with the engaging means or clutch portion formed with an annularly relieved surface 7a to form the abutment at 7a as illustrated in Patent Number 3,034,371. This structural arrangement provides the engaging means or clutch arranged to fit between the annularly relieved portion 9 to constitute the driving means for the adapter 11, the latter being mounted in non-rotatable relation upon a polygonal portion 10a of the yoke sleeve 12. The said yoke sleeve is journally received within the hub 13 of the valve yoke as shown. An inner annular median wall portion 14 provides a partition between the outer recess 15 and the inner recess portion 16. Upon the wall 14 respective outer and inner thrust bearings 17 and 18 are mounted so as to abut thereagainst. It will be apparent that the inner threaded nut 19 mounted on the threaded shank 30 draws the yoke sleeve 12 inwardly against the respective thrust bearings. The nut 19 is locked in place by means of the threaded pin 21 after determination of the proper rotational clearance on its bearings for the yoke sleeve 2.

In effecting the attachment of the unit 1 in operative position relative to the valve stem 4, an interposed flanged housing 22 for the adapter is mounted on the outer surface 20 of the yoke 13. It is attached firmly by means of cap screws 23 to the base portion 24 of the unit casing 2.

Figure 3:
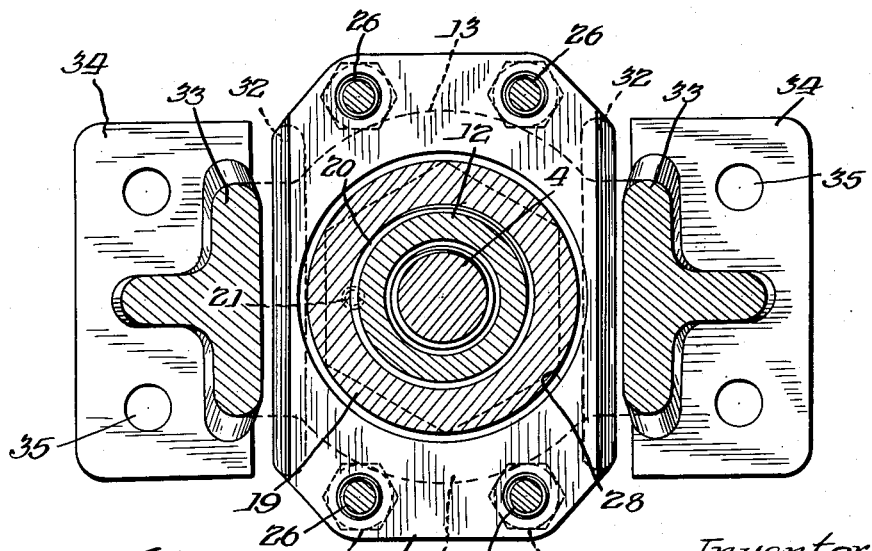

In providing for its attachment securely to the yoke hub, and as more clearly shown in FIGS. 2 and 3, the preferably integral spaced apart bosses 25 are provided on the adapter housing 22. The bosses are suitably tapped to threadedly receive the depending bolts 26, the latter bolts extending inwardly of the assembly past the yoke hub 13. Inwardly of the said hub 13, a plate member 27 apertured as at 28 is applied to the underside of the said yoke hub upon displacement or removal of the valve stem 4 to fit over the latter member and also over the nut 19 to bear snugly against said undersurface of the yoke hub at 29, as shown. The said plate 27 is held securely in place on the studs 26 by means of the nuts 31. The apertured plate 27 is preferably provided on its underside with the stiffening ribs 32 and fits substantially non-rotatably between the yoke arms 33 depending from the hub 13. The said yoke arms are provided at their inner extremities as shown more clearly in FIG. 3 with the usual flattened pads 34 apertured at 35 for effecting the attachment thereof to a valve bonnet (not shown).

In operation, it will be clear that the operation of valve stem 4 takes place upon suitable rotation of the yoke sleeve. The latter movement is effected by the cooperation between the clutch portion 8 of the rotatable drive sleeve 5 of the unit in its engagement of the adapter 11.

Rotation of the yoke sleeve member 12 follows and causes the engaging threaded stem 4 to be moved axially in a direction determined upon the direction of rotation of the unit sleeve member 5.

Attachment is of course made of the unit hereinabove described after the usual handwheel (not shown) and ordinarily mounted on the yoke sleeve 12 at polygonal portion 10a and its retaining wheel nut (also not shown) and normally mounted on threads 12a have been removed. Thus, the wheel nut is not replaced after the unit is applied, and the adapter 11 takes the place of the handwheel in this conversion.

It will accordingly be apparent that a relatively economical and durable form of adapter or conversion construction has been provided for attaching and making the change-over of the motor or gear operator unit 1 to the valve as a quick and convenient substitute for the valve stem handwheel.

While only a single embodiment has been shown and described, it will be obvious that many other forms may be used within the spirit of the invention, the scope of which should be measured by the appended claims.

We claim:

1. Adapter connection means to a gear operator for a valve with non-rotatable rising stem and a yoke having a hollow hub with a rotatable ball bearing yoke sleeve therein to journal the stem, the combination comprising:
   an adapter member mounted over the stem on said yoke sleeve in non-rotatable relation to the latter member and revolvable with the said yoke sleeve about the central axis of the stem;
   a rotatable drive sleeve for the said gear operator with an aperture therethrough substantially coaxial with said valve yoke sleeve for receiving said rising stem predeterminately;
   said drive sleeve being actuated by said gear operator and having a lower clutch portion thereon receiving a complementary clutch portion on the said adapter in driving relation thereto;
   a casing for the gear operator with a base portion for guiding the said rotatable drive sleeve;
   the base portion of said casing supporting the gear operator relative to said yoke;
   an interposed flanged housing connected to said base portion of the casing between said base portion of the casing and the hub of the said yoke, the said housing having spaced apart depending threaded means thereon;
   means on the said gear operator casing for connecting said gear operator to the hub of the said yoke including said flanged housing and a transversely extending apertured plate in a lower plane abutting an inner end surface on the valve yoke hub, the said plate having apertures for receiving inner end portions of said depending threaded means and threaded means engaging the apertured plate and said end portions of said depending threaded means projecting through the apertures of the said plate to draw said plate in clamped relation against said inner surface of said yoke hub whereby to hold the said gear operator firmly onto the valve yoke.

2. The subject matter of claim 1, the said yoke having a pair of oppositely disposed arms, the said apertured plate extending between said arms in proximity to the yoke hub to position the said gear operator against substantial transverse movement relative to the said yoke.

3. The subject matter of claim 1, the said interposed flanged housing having on an inner end portion thereof a recess for receiving an outer end of said yoke hub whereby to align the gear operator with the common central axis of the stem, adapter and yoke sleeve.

4. The subject matter of claim 2, the said apertured plate having oppositely disposed stiffening ribs on its underside substantially defining side limits thereof adjacent opposite inner portions of the said yoke arms.

References Cited in the file of this patent

UNITED STATES PATENTS

| | | |
|---|---|---|
| 1,156,493 | Rice | Oct. 12, 1915 |
| 2,297,597 | White | Sept. 29, 1942 |
| 2,324,211 | Hodgson et al. | July 13, 1943 |
| 2,638,368 | Weinberg | May 12, 1953 |
| 2,694,320 | Kron | Nov. 16, 1954 |
| 2,859,639 | Bryant | Nov. 11, 1958 |
| 2,948,557 | Howe et al. | Aug. 9, 1960 |
| 3,034,371 | Cantalupo et al. | May 15, 1962 |